United States Patent
Tour et al.

(10) Patent No.: US 7,459,137 B2
(45) Date of Patent: Dec. 2, 2008

(54) PROCESS FOR FUNCTIONALIZING CARBON NANOTUBES UNDER SOLVENT-FREE CONDITIONS

(75) Inventors: James M. Tour, Bellaire, TX (US); Christopher A. Dyke, Humble, TX (US)

(73) Assignee: William Marsh Rice University, Houston, TX (US)

( * ) Notice: Subject to any disclaimer, the term of this patent is extended or adjusted under 35 U.S.C. 154(b) by 637 days.

(21) Appl. No.: 10/521,903

(22) PCT Filed: Jul. 15, 2003

(86) PCT No.: PCT/US03/22072
§ 371 (c)(1), (2), (4) Date: Jan. 14, 2005

(87) PCT Pub. No.: WO2004/007364
PCT Pub. Date: Jan. 22, 2004

(65) Prior Publication Data
US 2005/0255030 A1 Nov. 17, 2005

Related U.S. Application Data

(60) Provisional application No. 60/396,373, filed on Jul. 16, 2002, provisional application No. 60/396,371, filed on Jul. 16, 2002.

(51) Int. Cl.
*D01F 9/12* (2006.01)
*D01F 11/14* (2006.01)
*C01B 31/02* (2006.01)
*B82B 3/00* (2006.01)

(52) U.S. Cl. .............. 423/447.1; 423/447.4; 423/460; 977/840; 977/842; 977/847; 977/895; 977/896

(58) Field of Classification Search .............. 423/447.1, 423/447.4, 460; 977/840, 842, 847, 895, 977/896
See application file for complete search history.

(56) References Cited

U.S. PATENT DOCUMENTS 5,547,748 A * 8/1996 Ruoff et al. .................. 428/323
6,031,711 A * 2/2000 Tennent et al. .............. 361/303

(Continued)

FOREIGN PATENT DOCUMENTS

WO      WO 98/39250      9/1998

(Continued)

OTHER PUBLICATIONS

T. Tanaka et al, Mechanochemical Arylation and Alkylation of Fullerene C60 Under the Solvent-Free Conditions, 1999, Synthetic Communications, 29(42), 4397-4402.*

(Continued)

*Primary Examiner*—Timothy C Vanoy
*Assistant Examiner*—Serena L Hanor
(74) *Attorney, Agent, or Firm*—Winstead PC (57) ABSTRACT

The present invention provides methods by which carbon nanotubes can be functionalized under solvent-free conditions. As extremely large quantities are typically required to dissolve or disperse carbon nanotubes, solvent elimination the processes more favorable for scale-up. Such processes are also amenable to a wide variety of chemical reactions are functionalizing agents.

25 Claims, 9 Drawing Sheets

U.S. PATENT DOCUMENTS

| | | | |
|---|---|---|---|
| 6,187,823 | B1 * | 2/2001 | Haddon et al. ............... 516/32 |
| 6,203,814 | B1 * | 3/2001 | Fisher et al. ............... 424/443 |
| 6,841,139 | B2 | 1/2005 | Margrave et al. |
| 7,250,147 | B2 * | 7/2007 | Tour et al. ............... 423/447.1 |
| 2001/0031900 | A1 * | 10/2001 | Margrave et al. ........... 570/126 |
| 2005/0074390 | A1 * | 4/2005 | Tour et al. ............... 423/447.1 |
| 2005/0074613 | A1 * | 4/2005 | Tour et al. ................. 428/408 |
| 2005/0207963 | A1 * | 9/2005 | Tour et al. ............... 423/447.1 |

FOREIGN PATENT DOCUMENTS

| | | |
|---|---|---|
| WO | WO 00/26138 | 5/2000 |
| WO | WO 01/30694 | 5/2001 |
| WO | WO 02/060812 | 8/2002 |

OTHER PUBLICATIONS

Maggini et al, Addition of Azomethine Ylides to C60: Synthesis, Characterization, and Functionalization of Fullerene Pyrrolidines, 1993, Journal of American Chemical Society, 115, 9798-9799.*

Sun, et al., "Soluble Dendron-Functionalized Carbon Nanotubes: Preparation, Characterization, and Properties", 13 Chem. Mater. (2001), pp. 2864-2869.

Chiu, et al., "Interconnection of Carbon nanotubes By Chemical Functionalization", 80(20) Appl. Phys. Lett. (2002), pp. 3811-3813.

Tanaka, et al., "Solvent-Free Organic Synthesis", 100 Chem. Rev. (2000), pp. 1025-1074.

Bahr, et al., "Covalent chemistry of single-wall carbon tubes", 12 J. Mater. Chem. (2002), pp. 1952-1958.

Ebbesen et al., "Large-scale synthesis of carbon nanotubes" 358 Nature (1992), pp. 220-222.

Ebbesen et al., "Carbon Nanotubes", 24 Annual Review of Materials Science (1994), pp. 235-264.

Iijima et al., "Helical microtubes of graphitic carbon" 354 Nature (1991), pp. 56-58.

Saito et al., Physical Properties of Carbon Nanotubes, 1998, London: Imperial College Press.

Sun et al., "Creating the narrowest carbon nanotubes" 403 Nature (2000), p. 384.

Qin et al., "Electron Microscope imaging and contrast of smallest carbon nanotubes", 349 Chem. Phys. Lett. (2001), pp. 389-393.

Wang et al., "The smallest carbon nanotube", 408 Nature (2000), pp. 50-51.

Hafner et al., "Catalytic growth of single-wall carbon nanotubes from metal particles" 296 Chem. Phys. Lett. (1998), pp. 195-202.

Cheng et al., "Bulk morphology and diameter distribution.." 289 Chem. Phys. Lett. (1998), pp. 602-610.

Nikolaev et al., "Gas-phase catalytic growth of single-walled carbon nanotubes.."313 Chem. Phys. Lett. (1999), pp. 91-97.

Thess et al., "Crystalline Ropes of Metallic Carbon Nanotubes" 273 Science (1996), pp. 483-487.

Vander Wal et al., "Flame and furnace synthesis of single-walled and multi-walled carbon nanotubes . . . ", 105 J. Phys. Chem. B. 42 (2001), pp. 10249-10256.

Rao et al., "Functionalised carbon nanotubes from solutions" Chem. Commun. (1996),pp. 1525-1526.

Wong, et al., "Covalently functionalized nanotubes as nanometresized probes in chemistry and biology", 394 Nature (1998), pp. 52-55.

Liu, et al., "Fullerene Pipes" 280 Science (1998), pp. 1253-1256.

Chen, et al., "Solution Properties of Single-Walled Carbon Nanotubes", 282 Science (1998), pp. 95 98.

Aihara, "Lack of Superaromaticity ib=n Carbon nanotubes", 98 J. Phys. Chem. (1994), pp. 9773-9776.

Chen, Y. et al., "Chemical attachment of organic and functional groups to single-walled carbon nanotube material", 13 J. Mater Res. (1998), pp. 2423-2431.

Bahr et al., "Covalent chemistry of single-wall carbon nanotubes", 12 J. Mater. Chem. (2002), pp. 1952-1958.

Banerjee et al., "Rational Chemical Strategies for Carbon Nanotube Functionalization", 9 Chem. Eur. J.(2003), pp. 1899-1908.

Holzinger et al., "Sidewall Functionalization of Carbon Nanotubes", 40 Angew. Chem. Int. Ed. 21 (2001), pp. 4002-4005.

Bahr et al., "Dissolution of small diameter single-wall arbon nanotubes in organic solvents", Chem. Commun. (2001), pp. 193-194.

Tanaka et al., "Solvent-Free Organic Synthesis", 100 Chem. Rev. (2000), pp. 1025-1074.

Georgakilas et al., "Organic Functionalization of Carbon Nanotubes", 124 J. Am. Chem. Soc., 5 (2002), pp. 760-761.

Meier et al., "Addition of Nitrile Oxides to C60: Formation of Isoxazolene Derivatives of Fullerenes", 58 J. Org. Chem. (1993), pp. 4524.

Belik et al., "Diels-Alder Adduct of C60 and 4-Carboxy-o-quindimethane: Synthesis and Chemical Transformations", 60 J. Org. Chem. Soc. (1995), pp. 3307-3310.

Hirsch et al., "Fullerene Chemistry in Three Dimesions: Isolation of Seven Regioisomeric Bisadducts and Chiral Trisadducts of C60 and Di(ethoxycarbonyl) methylene", 33 Angew. Chem. Int. Ed. (1994), pp. 437-438.

Liang et al., "Electronic Structures and Optical properties of Open and capped Carbon nanotubes", 122 J. Am. Chem. Soc. (2000), pp. 11129-11137.

Jost et al., "Diameter grouping in bulk samples of single-walled carbon nanotubes from optical absorption spectroscopy", 75 J. Appl. Phys. Lett. (1999), pp. 2217-2219.

Wu et al., "Finite size effects in carbon nanotubes", 77(16) Appl. Phys. Lett. (2000), pp. 2554-2556.

Richter et al., "Theory of Size-Dependent Resonance Raman Scattering from Carbon Nanotubes", 79 Phys. Rev. Lett., Science (1997), pp. 2738-2740.

Rao et al., "Diameter-Selective Raman Scattering from Vibrational Modes in Carbon Nanotubes", 275 Science (1997), pp. 187-191.

Li et al., "Temperature dependence of the Raman spectra of single-wall carbon nanotubes", 76 Appl. Phys. Lett. (2000), pp. 2053-2055.

Chiang et al., "Purification and Characterization of Single-Wall Carbon Nanotubes . . . ", 105 J. Phys. Chem. B (2001), pp. 8297-8301.

Bahr et al., "Functionalization of Carbon nanotubes by Electrochemical Reduction of Aryl Diazonium Salts: A Bucky Paper Electrode", 123 J. Am. Chem. Soc. (2001), pp. 6536-6542.

Bahr et al., "Highly Functionalized Carbon Nanotubes Using in Situ Generated Diazonium Compounds", 13 Chem. Mater. (2001), pp. 3823-3824.

Niyogi et al., "Chemistry of Single-Walled Carbon Nanotubes", 35 Acc. Chem. Res. (2002), pp. 1105-1113.

Hirsch, "Functionalization of Single-Walled Carbon Nanotubes", 41, No. 11, Angew. Chem. Int. Ed., (2002), pp. 1853-1859.

Meier et al., "Benzyne Adds Across a Closed 5-6 Ring Fusion in C70: Evidence for Bond Delocalization in Fullerenes", 120 J. Am. Chem. Soc. (1998), pp. 2337-2342.

Himeshima et al., "Fluoride-Induced 1,2-Elimination of O-Trimethylsilyl-Phenyl Triflate to Benzyne Under Mild Conditions", Chem. Soc. of Japan (1983), pp. 1211-1214.

Mitchell et al., "Dispersion of Functionalized Carbon Nanotubes in Polystyrene", 35 Macromolecules (2002), pp. 8825-8830.

* cited by examiner

PROCESS FOR FUNCTIONALIZING CARBON NANOTUBES UNDER SOLVENT-FREE CONDITIONS

CROSS-REFERENCES TO RELATED APPLCATIONS

This application claims priority from the following U.S. provisional applications: Ser. No. 60/396,371 filed Jul. 16, 2002 and entitled, "Use of Dry Mixing for the Purpose of Functionalizing Single-Wall Carbon Nanotubes," and Ser. No. 60/396,373 filed Jul. 16, 2002 and entitled, "Use of Solvent-Free Conditions for the Purpose of Functionalizing Carbon Nanotubes."

The present invention was made in connection with research pursuant to grant numbers JSC-NCC-9-77 and NCC-01-0203 from the National Aeronautics and Space Administration, DMR-0073046 from the National Science Foundation Division of Materials Research, and F49620-01-1-0364 from the Air Force Office of Scientific Research.

FIELD OF INVENTION

The present invention relates broadly to carbon nanotubes. More specifically, the invention relates to functionalization of carbon nanotubes under solvent-free conditions and to uses for the functionalized carbon nanotubes.

BACKGROUND OF THE INVENTION

Fullerenes are closed-cage molecules composed entirely of $sp^2$-hybridized carbons, arranged in hexagons and pentagons. Fullerenes (e.g., $C_{60}$) were first identified as closed spheroidal cages produced by condensation from vaporized carbon. Fullerene tubes are produced in carbon deposits on the cathode in carbon arc methods of producing spheroidal fullerenes from vaporized carbon. Ebbesen et al., Nature, 1992, 358:220 and Ebbesen et al., Annual Review of Materials Science, 1994, 24:235-264. Such tubes are referred to herein as carbon nanotubes. Many of the carbon nanotubes made by these processes were multi-wall nanotubes (MWNTs), i.e., the carbon nanotubes resembled concentric cylinders having multiple walls or shells arranged in a manner which can be considered analogous to Russian "nesting dolls." Carbon nanotubes having up to seven walls have been described in the prior art (Ebbesen et al., Annual Review of Materials Science, 1994, 24:235-264; Iijima et al., Nature, 1991, 354:56-58).

Single-wall carbon nanotubes (SWNTs) were discovered in 1993 in soot produced in an arc discharge in the presence of transition metal catalysts. Such SWNTs, comprised of a single tube of carbon atoms, are the smallest of the carbon nanotubes. SWNTs can typically have lengths of up to several micrometers (millimeter-long nanotubes have been observed) and diameters of approximately 0.5 nm-10.0 Onm (Saito et al., Physical Properties of Carbon Nanotubes, 1998, London: Imperial College ////Press; Sun et al., Nature, 2000, 403:384), although most have diameters of less than 2 nm (Saito et al.). Diameters as small as 0.4 nm have been reported, but these were formed inside either MWNTs (Qin et al., Chem. Phys. Lett., 2001, 349:389-393) or zeolites (Wang et al., Nature, 2000, 408:50-51). SWNTs, and carbon nanotubes of all types have since been produced by other techniques which include chemical vapor deposition techniques (Hafner et al, Chem. Phys. Lett., 1998, 296:195-202; Cheng et al., Chem. Phys. Lett., 1998, 289:602-610; Nikolaev et al., Chem. Phys. Lett., 1999, 313:91-97), laser ablation techniques (Thess et al., Science, 1996, 273:483487), and flame synthesis (Vander Wal et al., J. Phys. Chem. B., 2001, 105 (42): 10249-10256).

Since their discovery, there has been a great deal of interest in the functionalization (sometimes referred to as derivatization) of carbon nanotubes and, more particularly, in single-wall carbon nanotubes, to facilitate their manipulation, to enhance the solubility of such nanotubes, and to make the nanotubes more amenable to blend and composite formation. This is because single-wall carbon nanotubes are one of the more striking discoveries in the chemistry and materials genre in recent years. Nanotubes posses tremendous strength, an extreme aspect ratio, and are excellent thermal and electrical conductors. A plethora of potential applications for nanotubes have been hypothesized, and some progress is being made towards commercial applications. Accordingly, chemical modification of single-wall carbon nanotubes, as well as multi-wall carbon nanotubes, will be necessary for some applications. For instance, such applications may require grafting of moieties to the nanotubes: to allow assembly of modified nanotubes, such as single-wall carbon nanotubes, onto surfaces for electronics applications; to allow reaction with host matrices in polymer blends and composites; and to allow the presence of a variety of functional groups bound to the nanotubes, such as single-wall carbon nanotubes, for sensing applications. And once blended, some applications may benefit from the thermal removal of these chemical moieties, as described in PCT publication WO 02/060812 by Tour et al., filed Jan. 29, 2002 and incorporated by reference herein.

While there have been many reports and review articles on the production and physical properties of carbon nanotubes, reports on chemical manipulation of nanotubes have been slow to emerge. There have been reports of functionalizing nanotube ends with carboxylic groups (Rao, et al., Chem. Commun., 1996,1525-1526; Wong, et al., Nature, 1998, 394: 52-55), and then further manipulation to tether them to gold particles via thiol linkages (Liu, et al., Science, 1998, 280: 1253-1256). Haddon and co-workers (Chen, et al., Science, 1998, 282:95-98) have reported solvating single-wall carbon nanotubes by adding octadecylamine groups on the ends of the tubes and then adding dichlorocarbenes to the nanotube sidewall, albeit in relatively low quantities (~2%).

Success at covalent sidewall derivatization of single-wall carbon nanotubes has been limited in scope, and the reactivity of the sidewalls has been compared to the reactivity of the basal plane of graphite. Aihara, J. Phys. Chem. 1994, 98:9773-9776. A viable route to direct sidewall functionalization of single-wall carbon nanotubes has been fluorination at elevated temperatures, which process was disclosed in a co-pending application commonly assigned to the assignee of the present Application, U.S. patent application Ser. No. 09/810,390, "Chemical Derivatization Of Single-Wall Carbon Nanotubes To Facilitate Solvation Thereof; And Use Of Derivatized Nanotubes To Form Catalyst-Containing Seed Materials For Use In Making Carbon Fibers," to Margrave et al., filed Mar. 16, 2001. These functionalized nanotubes may either be de-fluorinated by treatment with hydrazine or allowed to react with strong nucleophiles, such as alkyl-lithium reagents. Although fluorinated nanotubes may well provide access to a variety of functionalized materials, the two-step protocol and functional group intolerance to organolithium reagents may render such processes incompatible with certain, ultimate uses of the carbon nanotubes. Other attempts at sidewall modification have been hampered by the presence of significant graphitic or amorphous carbon contaminants. Chen, Y. et al., J. Mater Res. 1998, 13:2423-2431.

For some reviews on sidewall functionalization, see Bahr et al., *J. Mater. Chem.*, 2002, 12:1952; Banerjee et al., *Chem. Eur. J.*, 2003, 9:1898; and Holzinger et al., *Angew. Chem. Int. Ed.*, 2001, 40(21): 4002-4005. Within the literature concerning sidewall-functionalization of SWNTs, however, there is a wide discrepancy of solubility values between reports. This is due to explicable variations in filtration methods.

A more direct approach to high degrees of functionalization of nanotubes (i.e., a one step approach and one that is compatible with certain, ultimate uses of the nanotubes) has been developed using diazonium salts and was disclosed in a co-pending application commonly assigned to the assignee of the present Application. See PCT publication WO 02/060812 by Tour et al., filed Jan. 29, 2002 and incorporated herein by reference. Using pre-synthesized diazonium salts, or generating the diazonium species in situ, reaction with such species has been shown to produce derivatized SWNTs having approximately 1 out of every 20 to 30 carbons in a nanotube bearing a functional moiety. Nevertheless, because of the poor solubility of SWNTs in solvent media, such processes require extraordinary amounts of solvent for the dissolution and/or dispersion of the SWNTs (~2 L/g coupled with sonication in most cases). See Bahr et al., *Chem. Commun.*, 2000, 193-194, incorporated herein by reference. This problem of an inordinate amount of solvent makes covalent functionalization on the industrial scale economically infeasible.

Solvent-free reactions have been used for a variety of systems. Such solvent-free conditions are generally superior in systems for which there is no special need for a solvent. Indeed, numerous solid-state organic reactions have been found in which the solid state reaction occurs more efficiently and more selectively than its solution-phase counterpart. Other advantages include low-costs, simplicity in process and handling, as well as reduced pollution. Indeed, such processes should work for many reactions that are completely dry, paste-like, or generally where the reagent can act as the solvent. See Tanaka et al., *Chem. Rev.*, 2000, 100:1025-1074, incorporated herein by reference.

SUMMARY OF THE INVENTION

The invention incorporates new processes for the chemical modification of carbon nanotubes. Such processes involve the derivatization of multi-and single-wall carbon nanotubes, including small diameter (ca. 0.7 nm) single-wall carbon nanotubes, under solvent-free conditions. The method allows the chemical attachment of a variety of organic compounds to the sidewalls and ends of carbon nanotubes. These chemically modified nanotubes have applications which include, but are not limited to, polymer blends and composites, molecular electronic applications, and sensor devices.

The present invention is directed toward methods of functionalizing carbon nanotubes by reacting them with organic functionalizing agents in the absence of solvent ("solvent-free" conditions). That such a solvent-free process works is somewhat counter-intuitive, however. Because the carbon nanotubes are so insoluble and are, in the case of SWNTs, retained in tight bundles (0.5 eV per nm of cohesive bond strength between any two tubes), one would not have suspected that a solvent-free reaction would work in this case. However, the present invention exploits the length scales of these materials to have a de-roping during the reaction even via a mild stirring.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

The present invention is directed towards the functionalization of carbon nanotubes under solvent-free conditions.

Carbon nanotubes, according to the present invention, comprise both multi- and single-wall varieties. They can be produced by any known technique and can be of any length, diameter, or chirality which suitably provides for carbon nanotubes functionalized under solvent-free conditions. Samples of carbon nanotubes, according to the present invention, can comprise a range of lengths, diameters, and chiralities, or the nanotubes within the sample may be largely uniform. The samples may also be in the form of "ropes" or macoscopic mats called "bucky papers." See PCT publication WO 98/39250 by Smalley et al., published Sept. 11, 1998; PCT publication WO 00/26138 by Smalley et al., published May, 11, 2000; and PCT publication WO 01/30694 by Smalley et al., published May 3, 2001; all of which are incorporated by reference herein.

Functionalization, according to the present invention, comprises attaching organic and/or organometallic moieties to the carbon nanotubes at their ends, their sidewalls, or both. Generally, this functionalization involves a covalent bond between the functional moiety and the carbon nanotube and it is accomplished by reacting the cabon nanotubes with an organic functionalizing agent. An organic functionalizing agent, according to the present invention, may be any species that suitably functionalizes carbon nanotubes under solvent-free conditions. Organic functionalizing agents include, but are not limited to, diazonium species; aryl radicals; alkyl radicals; aryl carbocations; aryl carbanions; alkyl carbanions; alkyl carbocations; 1,3-dipoles; carbenes; heteroatom-containing radicals, cations, and anions; ylides; benzyne; dienes; dienophiles, and combinations thereof. Organic fuctionalizing agents my further include organometallic species such as organozincates, carbenes, Grignard reagents, Gillman reagents, organolithium reagents, and combinations thereof.

The extent of functionalization is dependent on the organic functionalizing agent(s) used and the reaction conditions employed. The products comprise an extent of functionalization such that the ratio of organic functional groups to nanotube carbons ranges generally from about 1:1000 to about 1:1, specifically from 1:100 to about 1:5, and more specifically from about 1:30 to about 1:10. According to the present invention, "nanotube carbons" refers to the carbon atoms associated with nanotube structure (i.e., they were part of the carbon nanotube reactant).

While not intending to be bound by theory, it is acknowledged that there may be a continuum of bonding situations that range from covalent bonds to semi-ionic bonds to ionic bonds. In some embodiments of the present invention, the bonding between the carbon nanotube and the functional moiety is covalent in nature. In other embodiments of the present invention, the bonding between the carbon nanotube and the functional moiety may be semi-ionic in nature. In still other embodiments of the present invention, the bonding between the carbon nanotube and the functional moiety may comprise a combination of covalent and semi-ionic bonding.

A solvent, according to the present invention, is a substance capable of dissolving, or at least suspending, reactants and providing them with a fluid medium in which to react, but which is not directly involved in the chemical reaction. Correspondingly, solvent-free functionalizations of SWNTs eliminate this substance by eliminating the need for solvation or suspension of the reactants. As SWNTs are known to be only sparingly soluble in only a few solvents, elimination of this step is very beneficial.

Depending on the reactants employed, the reaction medium can be liquid, paste-like, or dry. A solvent is not needed to suspend or dissolve the reactants and provide an inert medium in which the reactants can react.

In some embodiments of the present invention, single-wall carbon nanotubes are functionalized without the use of solvent by mixing them with an aniline and an alkyl nitrite. Purified single-wall carbon nanotubes and an aniline derivative are stirred at a selected temperature followed by the slow addition of and alkyl nitrite. While not intending to be bound by theory, it is believed that the alkyl nitrite reacts with the aniline derivative to generate a reactive diazonium species. Rapid decomposition of this diazonium species yields a highly reactive aryl radical or aryl cation which, once generated, attacks the carbon nanotube framework, thereby generating the functionalized carbon nanotubes. While not intending to be bound by theory, the propensity of this aryl radical to dimerize is mitigated by its formation on or near the surface of the carbon nanotube. It is believed that such a process has the advantage of scalability and avoids the necessity of isolating and storing potentially unstable diazonium compounds, i.e., the species that reacts with the carbon nanotubes.

An inorganic nitrite (e.g., $NaNO_2$) in the presence of an acid (e.g., $H_2SO_4$ or acetic acid) can be used in lieu of an alkyl nitrite. The embodiments described below can all be practiced with this substitution. An acid, according to the present invention, includes, but is not limited to, sulfuric acid, acetic acid, hydrochloric acid, nitric acid, phosphoric acid, toluenesulphonic acid, trifluoroacetic acid, and combinations thereof.

By varying the reaction temperature, duration, type of mixing, amounts of reactants, and types of reactants, a multitude of variations of this embodiment exist.

Reaction temperatures, according to the present invention, range generally between about 0° C. and about 300° C., specifically between about 22° C. and about 100° C., and more specifically between about 22° C. and about 60° C.

Reaction duration, according to the present invention, ranges generally between about 1 minute and about 3 days, specifically from between about 1 minute and about 1 day, and more specifically from between about 10 minutes and about 4 hours.

Mixing, according to the present invention, can be any method that suitably brings the reactants together in such a way that they react to form functionalized carbon nanotubes in the absence of solvent. Mixing techniques include, but are not limited to, mechanical mixing (e.g., magnetic stir bar or motor-driven rotating shaft or shaft-and-paddle assembly), stirring, magnetic strirring, shaking, ball milling, high shear mixing, twin-screw mixing, and combinations thereof.

In some embodiments, the mixing takes place in the presence of a polymer for in situ functionalization/blending.

In some embodiments, the reaction is carried out in an inert atmosphere. Inert atmospheres include, but are not limited to, nitrogen, argon, helium, and combinations thereof.

Elimination of the solvent renders this technique far more amenable to scale-up than previous carbon nanotube functionalization techniques. Thus, the amount of reactant materials can be varied over a wide range, from approximately microscale quantities to industrial scale levels.

Figure 1:
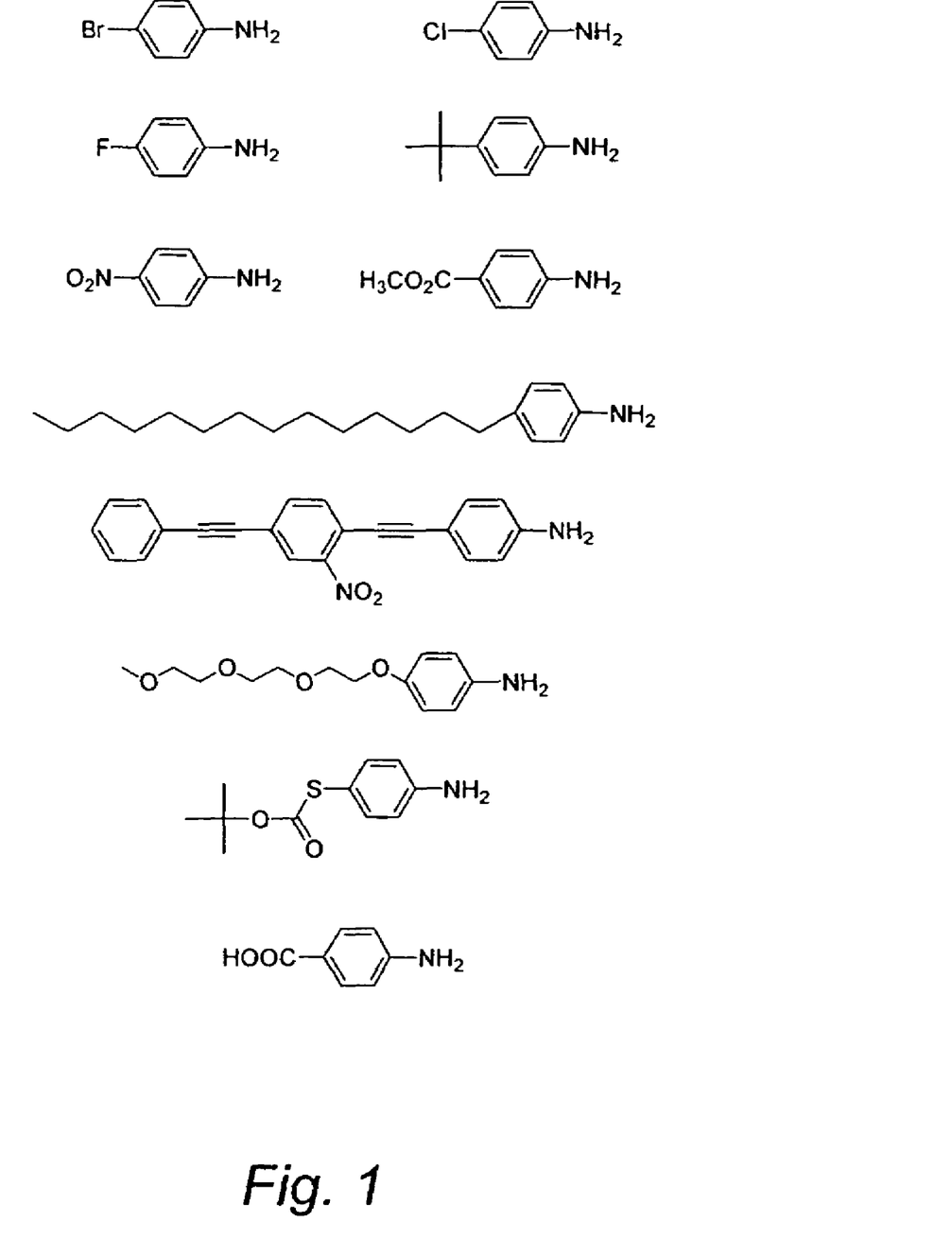
FIG. 1 depicts examples of suitable aniline derivatives, according to the present invention.

Aniline derivatives, according to the present invention, can be any aniline derivative that can react with a carbon nanotube in the presence of an alkyl nitrite to form a functionalized carbon nanotube. Aniline derivatives include, but are not limited to, ortho-, meta-, and para-substituted and di-, tri-, tetra- and penta-substituted anilines. Substituted aniline derivatives include, but are not limited to, where R (the substituent, or substituents in the case of multiple substitutions) is selected from the group consisting of halogen, nitro, cyano, alkyl, aryl, arylalkyl, hydroxy, carboxylic ester, carboxylic acid, thiocarbonate, amide, alkoxy, polyether, polyalkyl, hydroxyl alkyl, and combinations thereof. Examples of suitable aniline derivatives are shown in FIG. 1.

In other embodiments of the present invention, the carbon nanotubes are dry mixed with a pre-formed aryl diazonium salt. The mixture is then ball-milled or mechanically stirred to effect a reaction between the two species.

Figure 2:
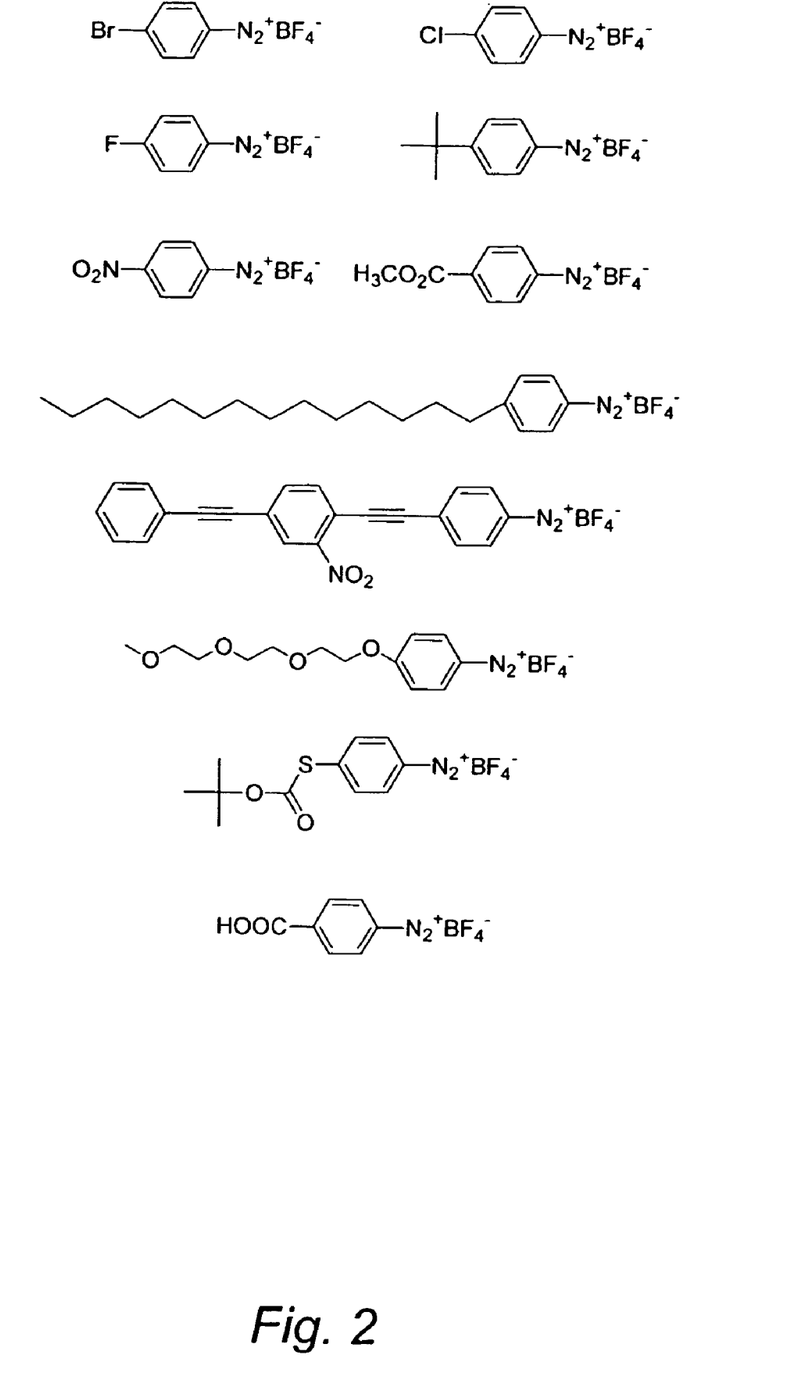
FIG. 2 depicts examples of suitable aryl diazonium salts, according to the present invention.

Aryl diazonium salts, according to the present invention, can be any aryl diazonium salt which suitably provides for a functionalized carbon nanotube under solvent-free conditions. Aryl diazonium salts include, but are not limited to, where R is selected from the group consisting of halogen, nitro, cyano, alkyl, aryl, arylalkyl, hydroxy, carboxylic ester, carboxylic acid, thiocarbonate, amide, alkoxy, polyether, polyalkyl, hydroxy alkyl, and combinations thereof. Examples of suitable aryl diazonium salts are shown in FIG. 2 and can also be found in PCT publication WO 02/060812 by Tour et al, published Aug. 8, 2002 and incorporated herein by reference. Other embodiments include variations on the above, wherein R is ortho- or meta-. Still other embodiments include di-, tri-, tetra-and penta-substituted species, and combinations thereof.

In these embodiments, the intensity and duration of the ball-milling action are important, as are the materials used in the ball-milling process (i.e., the container, the balls, etc.). These materials can be made of materials that range from the relatively soft (e.g., plastics) to an intermediate hardness (e.g., metals) to the relatively hard (e.g., ceramic). Milling operations can have durations which range generally from between about 1 minute and about 24 hours, specifically from between about 10 minutes and about 2 hours, and more specifically from between about 30 minutes and about 60 minutes. The milling intensity can be performed with any intensity which suitably provides for products according to the present invention, and the intensity chosen may depend on the hardness of the milling materials and the duration of the milling process.

In some embodiments of the present invention, a Wig-L-Bug ball milling device was employed to carry out the milling operation. In such embodiments, the milling intensity is a function of the driving motor's revolutions per minute (RPM). In general, the Wig-L-Bug device was operated at an intensity which ranged from about 100 RPM to about 1500 RPM.

The present invention is not limited to using aryl diazonium species. A number of other reaction types easily lend themselves to this solvent-free functionalization method. Examples of these other reaction types include, but are not limited to, Diels-Alder reactions; benzyne addition; Prato reactions (Georgakilas et al., *J. Am. Chem. Soc.*, 2002, 124: 760); reactions with alkyldiazonium species, nitrite oxide (Meier et al., *J. Org. Chem.*, 1993, 58:4524), quinodimethane via α,α'-dibromo-o-xylene/zinc wetted with THF (Belik et al., *J. Org. Chem. Soc.*, 1995, 60:3307), and ethyl bromomalonate/NaH (Hirsch et al., *Angew. Chem. Int. Ed.*, 1994, 33:437); and combinations thereof.

The following examples are presented to further illustrate the invention and are not to be construed as unduly limiting the scope of this invention.

EXAMPLES

Example 1

A typical solvent-free synthesis of functionalized nanotubes is shown in Scheme 1. Purified single-walled carbon nanotubes (SWNT) and 4-chloroaniline 1 are added to a flask and purged with nitrogen. The flask is then heated to 60° C. with magnetic stirring. After one hour, isoamyl nitrite is slowly added via syringe, and the reaction mixture is stirred for an additional one hour. After that time, the reaction mixture is diluted with a volume of acetonitrile that serves to solubilize any unreacted diazonium salt. Finally, the solid functionalized tubes 2 are collected by filtration.

Scheme 1

Figure 3:
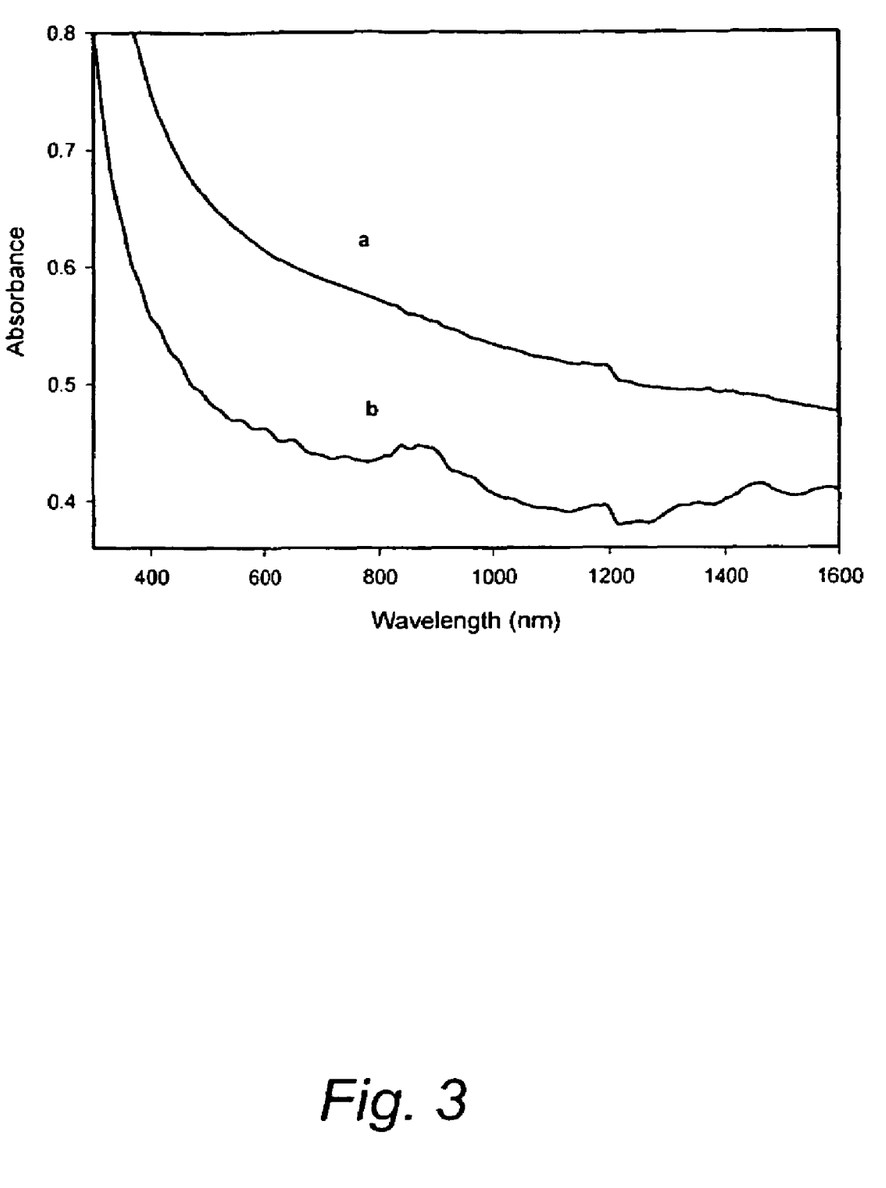
FIG. 3 depicts the UV/vis/NIR absorption spectra in dimethylformamide of SWNT (b) and an embodiment of the present invention (a)

Spectroscopic evidence suggests that a high degree of functionalization occurs using this solvent-free technique. Note that the subscript "n" for functionalized carbon nanotubes 2 merely denotes a plurality of organic functional groups having been added (because of variations in the length and diameter of the carbon nanotubes in the starting material, the extent of functionalization must be described in terms of a ratio of the number of organic functional groups added per the number of nanotube carbon atoms). The UV/vis/NIR absorption spectra of SWNT (Liang et al., J. Am. Chem. Soc., 2000, 122:11129-11137; Jost et al., J. Appl. Phys. Left., 1999, 75:2217-2219; Wu et al., Appl. Phys. Left., 2000, 77:2554-2556) and functionalized carbon nanotubes 2 are shown in FIG. 3. The peaks in the spectrum of SWNT are attributed to the band gap transitions in semiconducting tubes. The multiple peaks are due to tubes of different diameters and chiral indices of the tubes themselves. In the absorption spectra of functionalized carbon nanotubes 2, the intensity of these peaks is greatly diminished. This suggests that there is disruption of the extended π-network, and therefore covalent functionalization.

Figure 4:
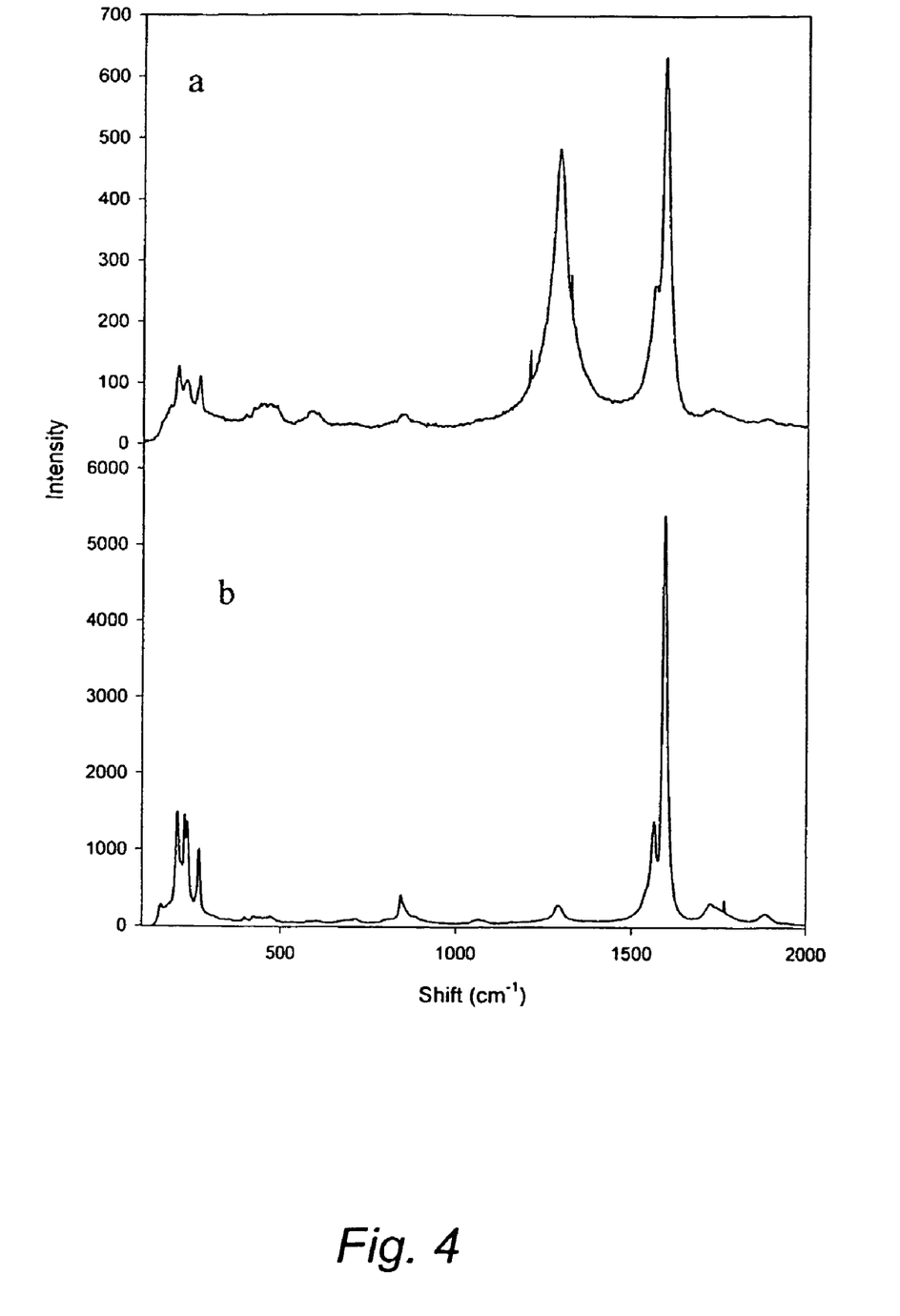
FIG. 4 depicts the Raman spectra of SWNT (b) and an embodiment of the present invention (a), wherein samples were pieces of bucky paper excited at 782 nm.

The Raman spectra also suggest covalent functionalization. The Raman spectra of unreacted SWNTs (Richter et al., Phys. Rev. Lett., Science, 1997, 79:2738-2740; Rao et al., Science, 1997, 275:187-191; Li et al., Appl. Phys. Left., 2000, 76:2053-2055) and of 2 are shown in FIG. 4. The spectrum of SWNTs has two characteristic bands. The radial breathing band ($\omega_r$) is centered around 230 cm$^{-1}$. The multiple peaks in this mode are due to varied nanotube diameters. The tangential ($\omega_t$) mode of the nanotubes is centered at 1590 cm$^{-1}$. Both of these features appear in the spectum of functionalized carbon nanotubes 2, however, there is a third peak of interest in its spectrum. The peak at 1290 cm$^{-1}$ is attributed to disorder ($\omega_d$) or sp$^3$-hybridized carbons in the nanotube carbon framework. This is further indicative of covalent functionalization of the SWNTs. Also, the intensity of the $\omega_r$, and $\omega_t$ is diminished, further indication of nanotube π-conjugation disruption via functionalization.

A Renishaw Micro-Raman was used to collect Raman data, and a Shimadzu UV-3101PC was used for UV/vis/NIR spectra.

Example 2

The solvent-free functionalizations described in this example were performed on HiPco-produced (Nikolaev et al.), purified (Chiang et al., J. Phys. Chem. B, 2001, 105: 8297-8301) SWNTs in an inert atmosphere. In a typical experiment (see Scheme 2), SWNTs (6 mg, 0.5 mmol of carbon) and 4-substituted aniline (4 eq per mole of carbon) were added to a flask equipped with a reflux condenser and a magnetic stir bar (note, however, that as little as 0.25 mol of aniline per mol of carbon has been shown to yield similar levels of functionalization). After the cautious, slow addition of isoamyl nitrite (0.32 mL, 4.8 eq per mole of carbon) via syringe, heating (60° C.) and vigorous stirring (magnetic stir bar) of the paste were commenced. After a time (1 hour is sufficient, but 1 day was used in this particular example), the paste was diluted with DMF and filtered through a PTFE (0.45 μm) membrane. The collected solid was washed with DMF until the filtrate became colorless. Dispersing the solid in DMF by sonication followed by filtration afforded purified functionalized nanotubes. Sonication was only used here to ensure that occlusion of small organics was not occurring to afford proper analyses; it is not required for the overall process. DMF was removed by washing with ether, and functionalized carbon nanotubes 2-6 were dried in a vacuum oven (65° C.) overnight and characterized. In all cases, the mass of the product was greater than the mass of the starting nanotubes.

Figure 5:
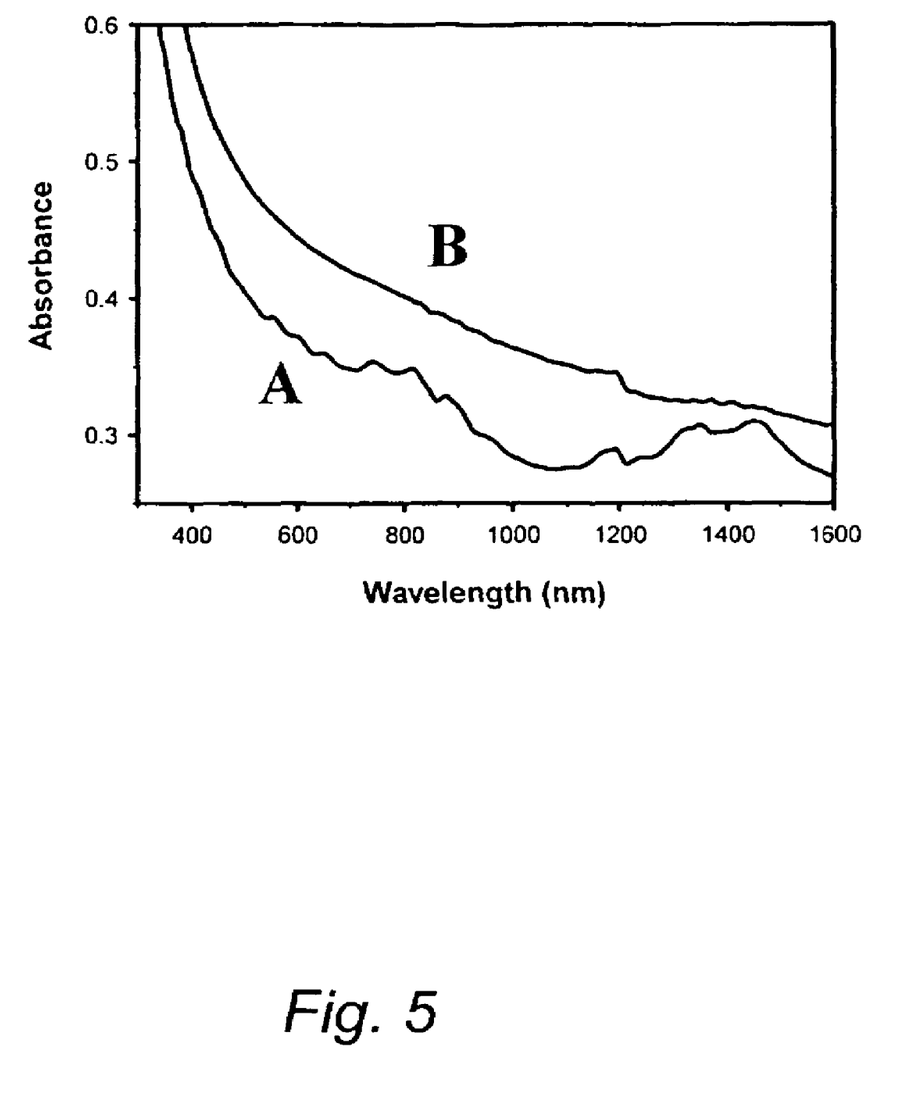
FIG. 5 depicts the absorption spectra in dimethylformamide of (A) pristine SWNTs and (B) an embodiment of the present invention.

Functionalized carbon nanotubes 2-6 were characterized by UV/vis/NIR absorption spectroscopy, Raman spectroscopy, and thermogravimetric analysis (TGA), with similar findings as those previously reported when large volumes of solvent (2 L per gram) were used (Bahr et al., J. Mater. Chem., 2002, 12:1952-1958; Bahr et al., J. Am. Chem. Soc., 2001, 123:6536-6542; Bahr et al., Chem. Mater., 2001, 13:3823-3824). The absorption spectrum of functionalized carbon nanotubes 2 (FIG. 5), which is nearly identical to the spectra of functionalized carbon nanotubes 3-6, displays a loss of features compared to the SWNT spectra, indicating a disruption in the electronic structure of nanotubes. The Raman spectrum of functionalized carbon nanotubes 2 (FIG. 6) is also considerably altered compared to the spectrum of pristine SWNTs, in that the radial breathing (230 cm$^{-1}$) and tangential (1590 cm$^{-1}$) modes characteristic of SWNTs are present, but the disorder (1290 cm$^-$) mode in the spectrum of functionalized carbon nanotubes 2 is greatly enhanced. Both the loss of structure in the absorption spectrum and the increased disorder mode in the Raman spectrum are indicative of covalent functionalization (Bahr et al., J. Mater. Chem., 2002, 12:1952-1958).

Figure 6:
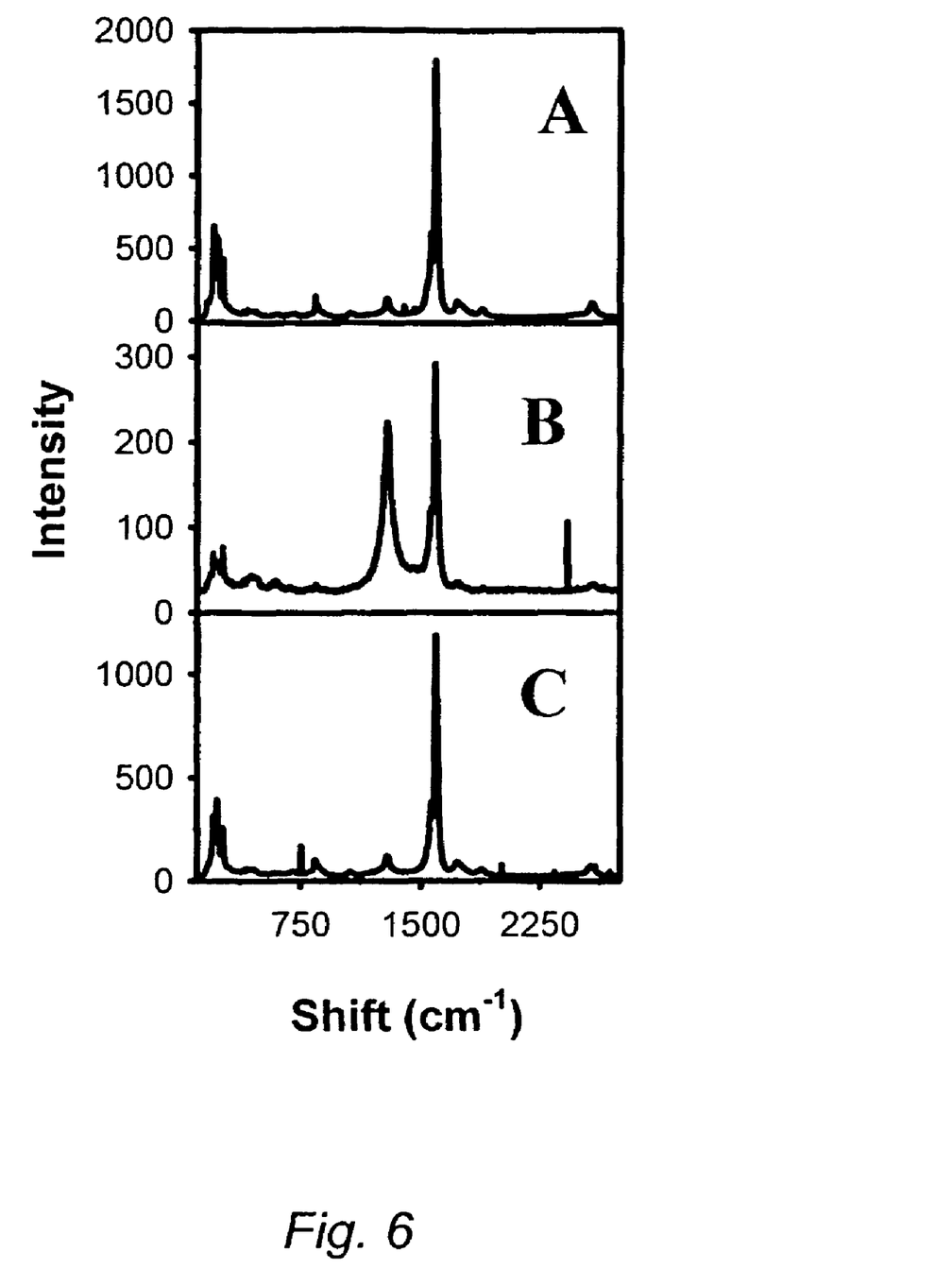
FIG. 6 depicts the Raman spectra (780.6 nm excitation) of (A) pristine SWNTs, (B) a solvent-free emodiment of the present invention, and (C) an embodiment of the present invention after TGA (wherein the sample from B was heated at 10° C./min to 750° C.) in argon to regenerate unfunctionalized SWNTs, like those shown in (A)

It has been previously shown (Bahr et al., J. Am. Chem. Soc., 2001, 123:6536-6542) that heating functonalized nanotubes in an inert atmosphere removes the organic moieties and restores the pristine nanotube structure (FIG. 6), therefore, TGA can provide a measure of the degree of functionalization (Bahr et al., J. Mater. Chem., 2002, 12:1952-1958; Niyogi et aL. Acc. Chem. Res., 2002, 35:1105; Hirsch, Angew. Chem. Int. Ed., 2002, 41:1853; all of which are incorporated herein by reference). After accounting for degassing at low temperatures, observed percent weight loss from TGA (10° C./min to 750° C. in argon) of functionalized carbon nanotubes 2-6 is as follows: 2 (22%), 3 (30%), 4 (34%), 5 (25%), and 6 (25%). These results are comparable to electrochemical and solvent-based thermal techniques and suggest a high degree of functionalization (Bahr et al., J. Am. Chem. Soc., 2001, 123:6536-6542; Bahr et al., Chem. Mater., 2001, 13:3823-3824; PCT publication WO 02/060812 by Tour et al, published Aug. 8, 2002; all of which are incorporated herein by reference). Removal of the functional moieties is confirmed by Raman spectroscopy, wherein the Raman spectrum is returned to a near pre-functionalization state, as shown in FIG. 6(c). In functionalizations involving species easily distinguishable by X-ray spectroscopy (such as 2), electron microprobe analysis (EMPA) yields functionalization stoichiometries in good agreement with the TGA/Raman technique Infrared spectroscopy (ATR-IR) indicates the presence of the functional addends: functionalized carbon nanotubes 4 has strong C-H stretching from the tert-butyl moiety at 2954 cm$^{-1}$ ($\Delta v$=−5), functionalized carbon nanotubes 5 has the strong carbonyl at 1722 cm$^{-1}$ ($\Delta v$=41), and functionalized carbon nanotubes 6 has the expected aromatic nitro group at 1516 and 1339 cm$^{-1}$ ($\Delta v$=43 and 15) ($\Delta v$ signifies the change in the absorbance frequency relative to the starting aniline).

The levels of solubility achieved were analogous to what has been obtained previously with the solvent-based techniques (Bahr et al., J. Am. Chem. Soc., 2001, 123:6536-6542; Bahr et al, Chem. Mater., 2001, 13:3823-3824). For example, the solubility of functionalized carbon nanotubes 4 was 0.03 and 0.4 mg/mL in THF and 1,2-dichlorobenzene, respectively, while the same material prepared using the former derivatization method showed 0.05 mg/mL solubility in THF. Note, however, that there is wide discrepancy between solubility values in the literature due to explicable variations in filtration methods. While the filtration protocol used herein and described in the references above comprises two filtrations using 0.2 μm PTFE filters, it is understandably difficult to compare these values to those obtained by others. Whereas many reports rely on "solubility" as an assessment of the level of functionalization, applicants contend the only accurate method presently available to determine this level is to use thermal gravimetric analysis (TGA) correlated with Raman spectroscopy, as described above.

Using the same solvent-free (stir bar) conditions except substituting multi-walled carbon nanotubes (MWNTs) for SWNTs also produced functionalized material. TGA analysis using the 4-chlorophenyl-substituted system gave 8% weight loss while the pristine MWNTs gave no weight loss under identical TGA conditions (10° C./min to 750° C. in argoro). The lower functionalization percentage in the MWNTs is likely due to their larger outer diameter causing them to be less reactive than the smaller diameter HiPco tubes. Secondly, the sheathed nature of MWNTs renders many of their sidewalls inaccessible.

The same reaction to form aryl chloride-functionalized carbon nanotubes 2 (Scheme 2) was performed for three different times (1 h, 1 d, and 3 d). The isolated products were spectroscopically identical and the TGA data were similar: 1 h (20%), 24 h (19%), and 72 h (22%). Hence, the reaction is complete after 1 h at 60° C.

In addition to short reaction times, the utility of diazonium chemistry was also observed by generating functionalized carbon nanotubes 2 from sodium nitrite (4.0 eq. per mole of carbon) and an acid (4.8 eq. per mole of carbon) as shown in Scheme 2. Both sulfuric acid and acetic acid promoted the formation of functionalized carbon nanotubes 2 according to UV/vis and Raman spectroscopy, and the degree of functionalization according to TGA (sulfuric acid (20%), acetic acid (22%)) Was equivalent.

Example 3

A typical solid-phase synthesis of functionalized nanotubes is shown in Scheme 3. Purified single-walled carbon nanotubes (SWNTs) and diazonium salt 7 are added to a metal vial loaded with a stainless steel ball bearing. The vial is then clamped into a mill mixer, and mixed for one hour. After that time, the solid reaction mixture is added to a volume of acetonitrile which serves to solubilize any unreacted diazonium salt. Finally, the solid functionalized carbon nanotubes 2 are collected by filtration.

Scheme 3

Figure 7:
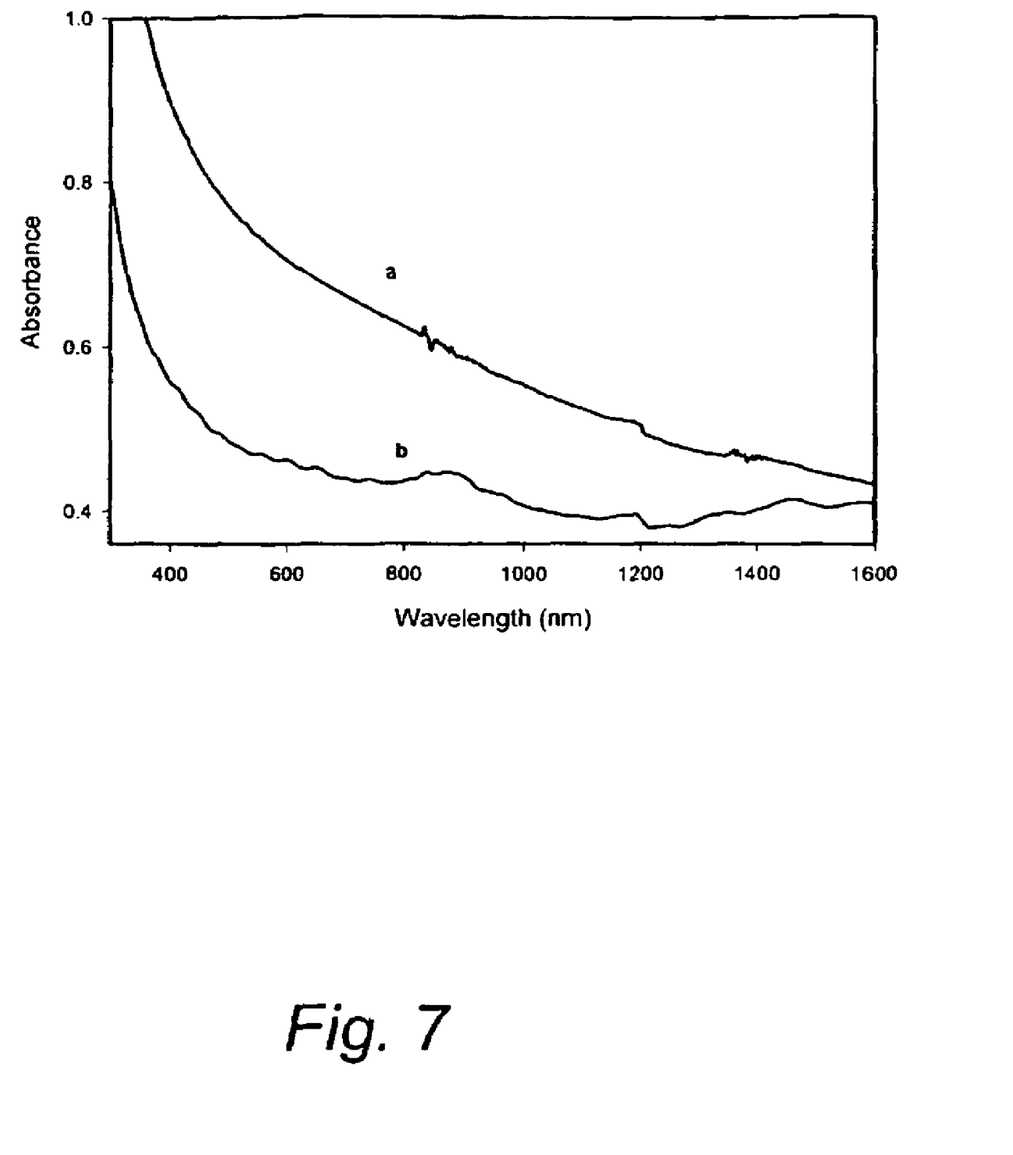
FIG. 7 depicts the UV/vis/NIR absorption spectra in dimethylformamide of SWNT (b) and an embodiment of the present invention (a)

Spectroscopic evidence suggests that a high degree of functionalization occurs using the mill mixing solid-phase technique. The UV/vis/NIR absorption spectra of SWNTs (Liang et al., J. Am. Chem. Soc., 2000, 122:11129-11137; Jost et al., J. Appl. Phys. Left., 1999, 75:2217-2219; Wu et al., Appl. Phys. Lett., 2000, 77:2554-2556) and functionalized carbon nanotubes 2 are shown in FIG. 7. The peaks in the spectrum of SWNTs are attributed to the band gap transitions in semiconducting tubes. The multiple peaks are due to tubes of different diameters and chiral indices of the tubes themselves. In the absorption spectra of functionalized carbon nanotubes 2, the intensity was greatly diminished, indicative of tube functionalization. This suggests that there is disruption of the extended π-network (pi-network), and therefore covalent functionalization.

Figure 8:
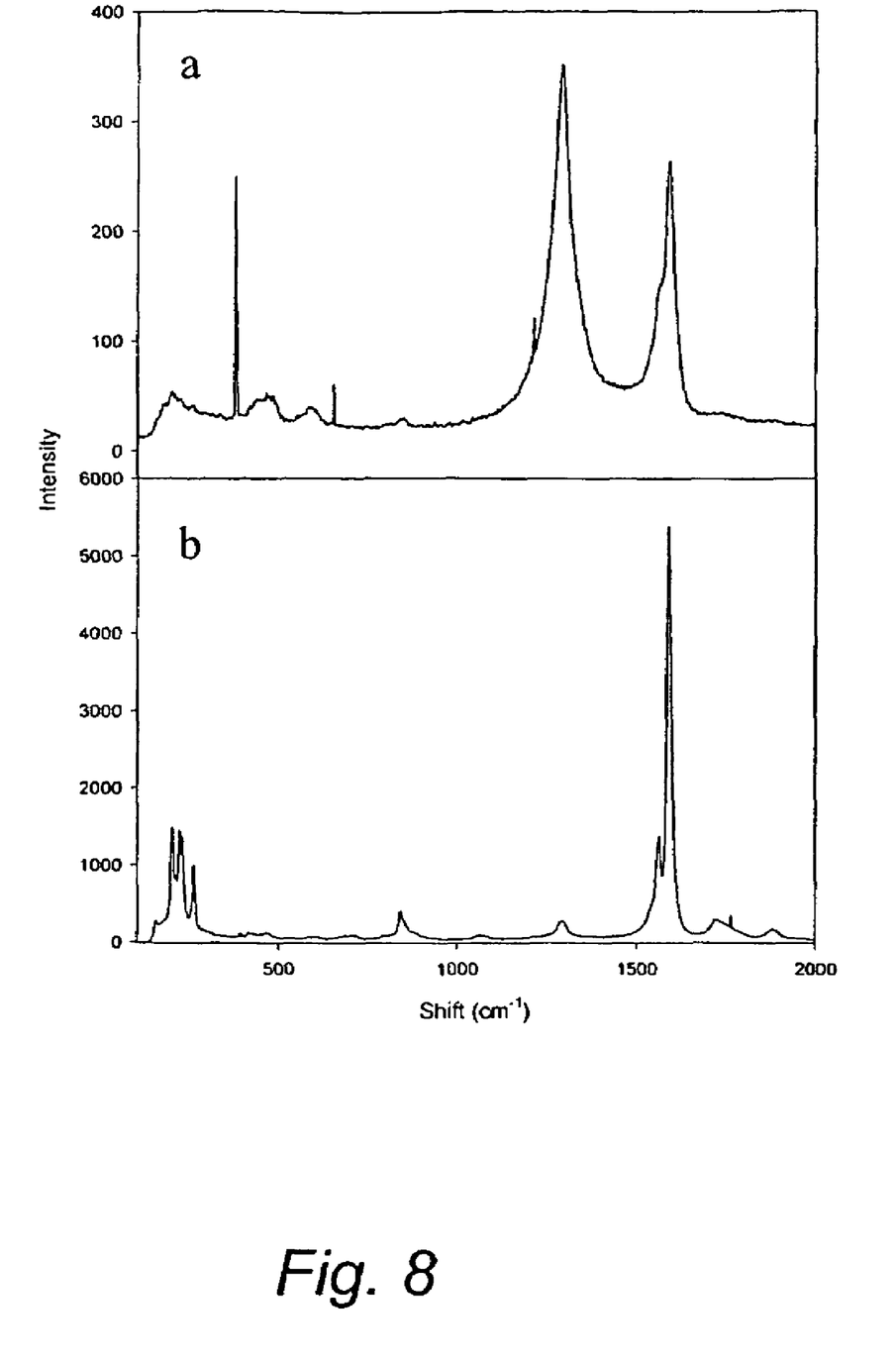
FIG. 8 depicts the Raman spectra of SWNT (b) and an embodiment of the present invention (a) made by a solvent-free technique utilizing mill mixing, wherein the samples were pieces of bucky paper excited at 782 nm.

The Raman spectra also suggest covalent functionalization. The Raman spectra of unfunctionalized SWNTs (Richter et al., Phys. Rev. Lett., Science, 1997, 79:2738-2740; Rao et al., Science, 1997, 275:187-191; Li et al., Appl. Phys. Lett., 2000, 76:2053-2055) and of 2 are shown in FIG. 8. The spectrum of SWNTs has two characteristic bands. The radial breathing band ($\omega_r$) is centered around 230 cm$^{-1}$. The multiple peaks in this mode are due to varied nanotube diameters. The tangential ($\omega^t$) mode of the nanotubes is centered at 1590 cm$^{-1}$. Both of these features appear in the spectrum of functionalized carbon nanotubes 2, however, there is a third peak of interest in its spectrum. The peak at 1290 cm$^{-1}$ is attributed to disorder ($\omega_d$) or Sp$^3$-hybridized carbons in the nanotube carbon framework. This is further indicative of covalent functionalization of the SWNTs. While undergoing this process, however, much of the SWNT structure could be compromised by the high sheer, pulverizing action of the process as described by Li et al. (Li et al., Appl. Phys. Left., 2000; 76:2053-2055). Thus, the intensity of the Raman-disorder mode might suggest tube destruction as an alternate possibility to a very high degree of functionalization.

A Dentsply Rinn model C32003A mill mixer was used as the mixing apparatus, a Renishaw Micro-Raman was used to collect Raman data, and a Shimadzu UV-31 01PC was used for UV/vis/NIR spectra.

A possible mechanism for the successful functionalization of SWNTs via the procedures described here is that the ropes or bundles of nanotubes are possibly exfoliated (or partially de-roped) due to the mechanical mixing action, Exfoliation of the bundles allows nanotubes to be covalently modified at the previously masked sites (due to roping) by the highly reactive aryl species being generated near the surface of the tubes.

Example 4

Benzyne addition (from anthranilic acid and isoamyl nitrite) (Meier et al., J. Am. Chem. Soc., 1998, 120:2337) was also attempted utilizing solvent-free conditions. The ATR-IR spectrum of the product exhibited a weak carbonyl stretch (1676 cm$^{-1}$) though it was not as intense as the strong carbonyl stretch (1721 cm$^{-1}$) observed for the carboxylic ester-functionalized carbon nanotubes 5 in scheme 2. Hence, the major product formed could be the benzyne adduct with some of the ortho-acid. However, when 2-(trimethylsilyl)phenyl-trifluoro-methanesulfonate was treated with tetra-butylammonium fluoride (TBAF), which has been shown to give benzyne (Himeshima et al., Chem. Lett., 1983, 121 1), unfunctionalized SWNTs were isolated.

Figure 9:
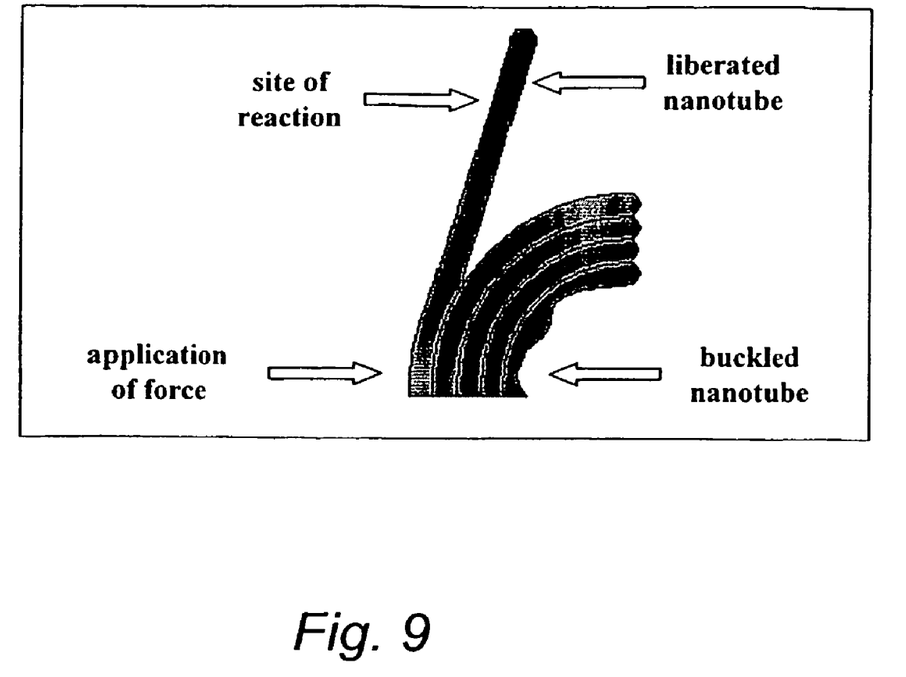
FIG. 9 is a schematic of the process of functionalization of carbon nanotubes without solvent.

While not intending to be bound by theory, it is believed for functionalization of nanotubes to occur, the bundles must be partially de-roped prior to reaction: initial reactions can then cause further de-roping. This partial de-roping is typically achieved by sonicating dilute solutions of nanotubes. With the present invention, however, initial de-roping is probably effected by mechanical means. FIG. 9 is a schematic of the functionalization of carbon nanotubes without solvent, wherein a mechanical force (stir bar or other mechanical mixing means) is applied to a nanotube bundle, which distorts the bundle causing bending, buckling and sites for the reaction to occur.

This fundamentally new approach to carbon nanotube derivatization paves the way for the large-scale functionalizations for use in materials studies, for example, wherein the surface bonding groups cause load transfer to the nanotubes in polymer blends; a phenomenon that is not observed with the pristine nanotube blends (Mitchell et al., Macromolecules, 2002, 35:8825).

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method for functionalizing carbon nanotubes comprising: a) selecting a plurality of carbon nanotubes; and b)

reacting said plurality of carbon nanotubes at the sidewall carbon atoms with an organic functionalizing agent in the absence of a solvent.

2. The method of claim 1, wherein the organic functionalizing agent is selected from the group consisting of diazonium species, aryl radicals, alkyl radicals, aryl carbocations, aryl carbanions, alkyl carbanions, alkyl carbocations, 1,3-dipoles, carbenes, heteroatom-containing radicals, heteroatom-containing cations, heteroatom-containing anions, ylides, benzyne, dienes, dienophiles, organozincates, carbenes, Grignard reagents, Gillman reagents, organolithium reagents, and combinations thereof.

3. The method of claim 1, wherein the carbon nanotubes are functionalized between about 1 functional group per 1000 carbon atoms of the carbon nanotubes and about 1 functional group per 5 carbon atoms of the carbon nanotubes.

4. The method of claim 1, wherein the carbon nanotubes are selected from the group consisting of single-wall carbon nanotubes, multi-wall carbon nanotubes, and combinations thereof.

5. The method of claim 1, wherein the carbon nanotubes are single-wall carbon nanotubes.

6. The method of claim 1, wherein the carbon nanotubes range in diameter between about 0.7 nm and about 2.0 nm.

7. The method of any one of claims 1-6, wherein the step of reacting further comprises adding a polymer to effect an in situ blending.

8. The method of claim 1, wherein the step of reacting further comprises mixing the plurality of carbon nanotubes and the organic flinctionalizing agent.

9. The method of claim 8, wherein the mixing comprises a mechanical operation.

10. The method of claim 9, wherein the mechanical operation is selected from the group consisting of ball milling, stirring, shaking, high shear mixing, twin-screw mixing, and combinations thereof.

11. The method of any one of claims 1-6 or 8-10, wherein the organic functionalizing agent is a reactive diazonium specie.

12. The method of claim 11, wherein the reactive diazonium specie is generated from an aryl diazonium salt.

13. The method of claim 12, wherein the aryl diazonium salt is selected from the group consisting of ortho-substituted aryl diazonium salts, meta-substituted aryl diazonium salts, para-substituted aryl diazonium salts, and combinations thereof.

14. The method of claim 12, wherein the aryl diazonium salt comprises:

and wherein R is selected from the group consisting of halogen, nitro, cyano, alkyl, aryl, arylalkyl, hydroxy, carboxylic ester, carboxylic acid, thiocarbonate, amide, alkoxy, polyether, polyalkyl, hydroxyalkyl, and combinations thereof.

15. The method of claim 12, wherein the aryl diazonium salt is selected from the group consisting of di-substituted aryl diazonium salts, tri-substituted aryl diazonium salts, tetra-substituted aryl diazonium salts, penta-substituted aryl diazonium salts, and combinations thereof.

16. The method of claim 12, wherein the diazonium specie is generated in situ from an aniline derivative and an alkyl nitrite species.

17. The method of any one of claims 16, wherein the aniline derivative is selected from the group consisting of ortho-substituted anilines, meta-substituted anilines, para-substituted anilines, and combinations thereof.

18. The method of any one of claims 16, wherein the aniline derivative is selected from the group consisting of di-substituted anilines, tri-substituted anilines, tetra-substituted anilines, penta-substituted anilines, and combinations thereof.

19. The method of any one of claims 16, wherein the aniline derivative comprises:

and wherein R is selected from the group consisting of halogen, nitro, cyano, alkyl, aryl, arylalkyl, hydroxy, carboxylic ester, carboxylic acid, thiocarbonate, amide, alkoxy, polyether, polyalkyl, hydroxyalkyl, and combinations thereof.

20. The method of claim 12, wherein the diazonium specie is generated in situ from an aniline derivative and an inorganic nitrite in the presence of an acid.

21. The method of claim 20, wherein the inorganic nitrite is sodium nitrite.

22. The method of claim 20, wherein the acid is selected from the group consisting of sulfuric acid, acetic acid, hydrochloric acid, nitric acid, phosphoric acid, toluenesulphonic acid, trifluoroacetic acid, and combinations thereof.

23. The method of claim 20, wherein the aniline derivative is selected from the group consisting of ortho-substituted anilines, meta-substituted anilines, para-substituted anilines, and combinations thereof.

24. The method claim 20, wherein the aniline derivative is selected from the group consisting of di-substituted anilines, tri-substituted anilines, tetra-substituted anilines, penta-substituted anilines, and combinations thereof.

25. The method of claim 20, wherein the aniline derivative comprises:

and wherein R is selected from the group consisting of halogen, nitro, cyano, alkyl, aryl, arylalkyl, hydroxy, carboxylic ester, carboxylic acid, thiocarbonate, amide, alkoxy, polyether, polyalkyl, hydroxyalkyl, and combinations thereof.

* * * * *